T. KITAOKA.
SIGNAL APPARATUS FOR AUTOVEHICLES.
APPLICATION FILED FEB. 19, 1916.

1,215,661.

Patented Feb. 13, 1917.
2 SHEETS—SHEET 1.

Witness:
W. M. Gentte.

Inventor.
Torahi Kitaoka
By Alex. H. Lidders
Attorney.

T. KITAOKA.
SIGNAL APPARATUS FOR AUTOVEHICLES.
APPLICATION FILED FEB. 19, 1916.

1,215,661.

Patented Feb. 13, 1917.
2 SHEETS—SHEET 2.

Witness:
W. M. Gentle.

Inventor.
Toraki Kitaoka
By
Attorney.

UNITED STATES PATENT OFFICE.

TORAKI KITAOKA, OF PASADENA, CALIFORNIA.

SIGNAL APPARATUS FOR AUTOVEHICLES.

1,215,661. Specification of Letters Patent. Patented Feb. 13, 1917.

Application filed February 19, 1916. Serial No. 79,455.

*To all whom it may concern:*

Be it known that I, TORAKI KITAOKA, a subject of the Emperor of Japan, residing at Pasedena, county of Los Angeles, State of California, have invented a certain new and useful Signal Apparatus for Autovehicles; and I do hereby declare the following to be a full, clear, and exact description of the invention, such as will enable others skilled in the art to which it appertains to make and use the same.

This invention relates to signal apparatus for auto vehicles; and it may be said to consist in the provision of the novel and advantageous features and in the novel and improved construction, arrangement, and combination of parts as will be apparent from the description and claims which follow hereinafter.

One object of the invention is to provide a novel and improved signal apparatus which can be readily applied to existing auto vehicles, and is adapted to indicate beforehand at a distance fore and aft of the auto vehicle whether the operator of the auto vehicle intends to turn it to the right or to the left.

Further objects of the invention are to provide a novel and improved apparatus of the nature specified which is simple in construction and economical to manufacture, install, and maintain, easy to operate, convenient to use, effective in action, and which can be used as side lights, and is adapted for both day and night service.

Other objects and the advantages of the invention will be apparent to those skilled in the art from a careful consideration of the following description of the preferred form of construction embodying the invention, taken in connection with the accompanying drawings in which—

Figure 1:
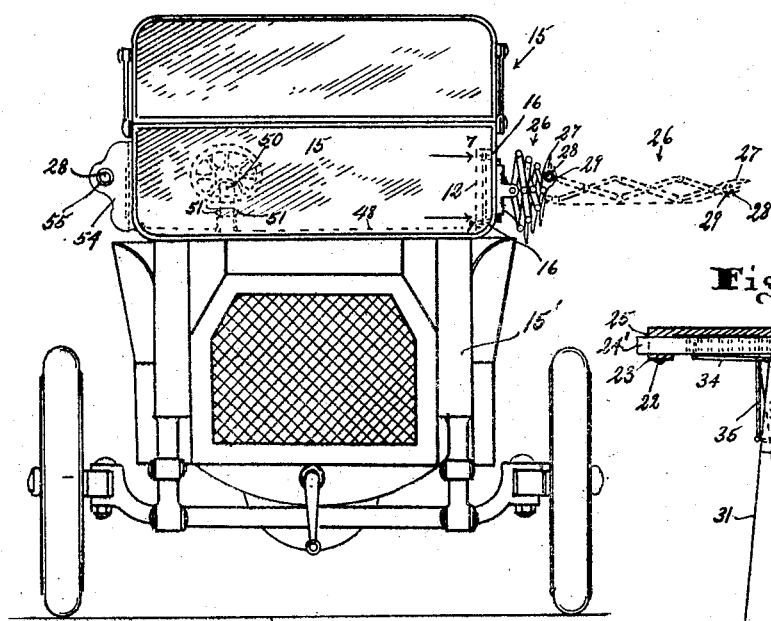
Figure 5:
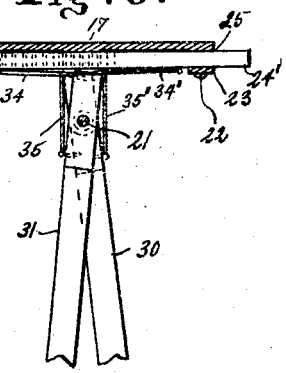
Figure 2:
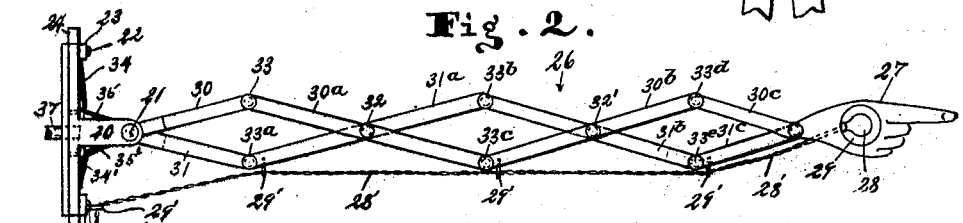
Figures 3, 4, 6:
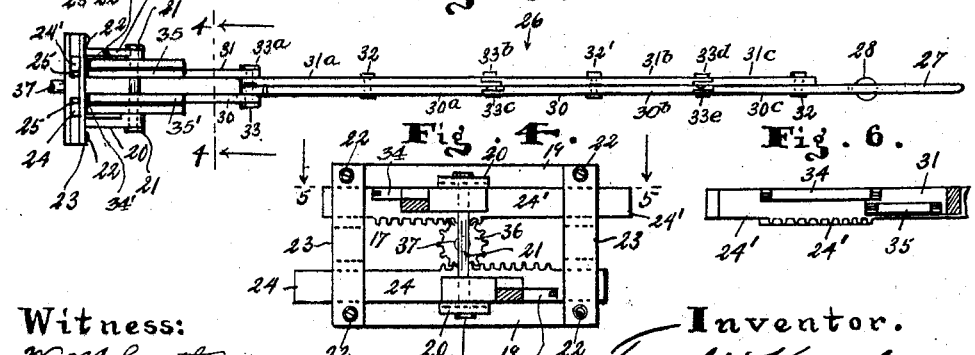
Figure 7:
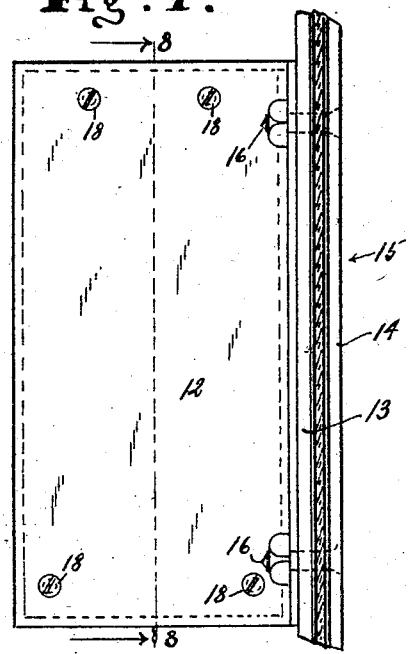
Figure 8:
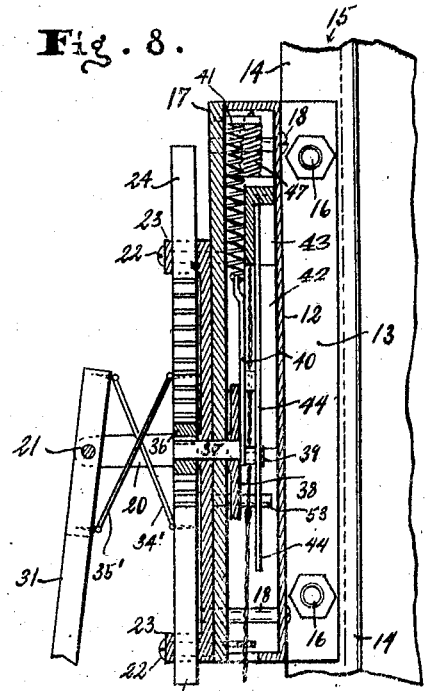
Figure 9:
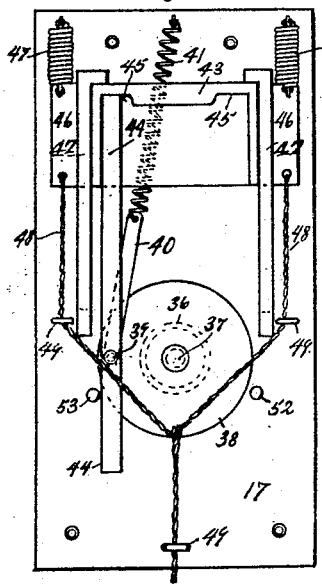
Figure 10:
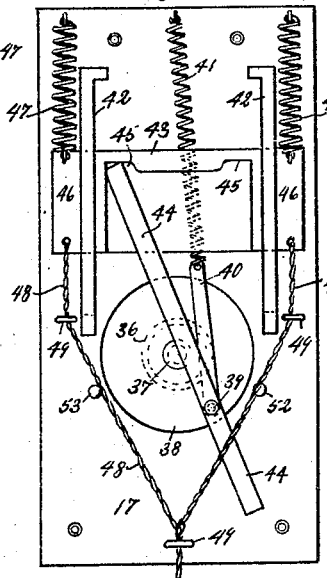
Figure 11:
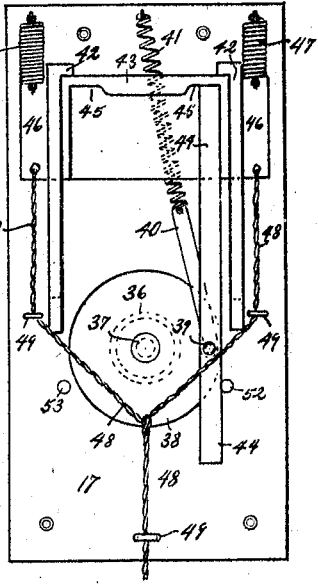

Figure 1 is a partly broken front view of an auto vehicle having the invention applied thereto; Fig. 2 is an enlarged broken elevational view showing the signal arm in partly expanded condition; Fig. 3 is a plan view of the same; Fig. 4 is an enlarged cross sectional view taken on the line 4—4 of Fig. 3; Fig. 5 is a cross sectional view taken on the line 5—5 of Fig. 4; Fig. 6 is a broken perspective view of one of the rack bars connected to the lazy tongs; Fig. 7 is an enlarged view of the signal apparatus attached to the frame of the windshield; Fig. 8 is a broken sectional view taken on the line 8—8 of Fig. 7; Fig. 9 is a broken view of the operating mechanism for the signal apparatus; and Figs. 10 and 11 are views of the operating mechanism with parts in changed position.

The frame 12 of the signal apparatus is provided with a flange 13 whereby it is secured by bolts 16 or other suitable means to the side of the frame 14 of the windshield 15 which is mounted on the auto vehicle 15'. The frame 12 is preferably made in the form of a box or casing provided with a cover plate 17 which is held in place by the screws 18. On the cover plate 17 are arranged the spaced guides 19 having thereon the lugs or ears 20 on which is mounted the pivot 21. The guides 19 are preferably secured by screws 22 to the cover plate 17, and have at their ends the crosspieces 23. Rack bars 24 and 24' are slidably fitted against the guides 19 and have their end portions passing freely through openings 25 in the crosspieces 23. The expansible signal arm 26 preferably consists of a lazy tongs which has on one end thereof the visual signal consisting of the hand 27 and the electric lamp 28 which is preferably arranged in an opening 29 provided in the hand 27. The other end portion of the lazy tongs is mounted on the pivot 21 and is operatively connected to the rack bars 24 and 24'. The lazy tongs consists of the pairs of bars 30 and 31, 30$^a$ and 31$^a$, 30$^b$ and 31$^b$, and 30$^c$ and 31$^c$, which as shown have their ends connected by pivots 33 and 33$^a$, 33$^b$ and 33$^c$, and 33$^d$ and 33$^e$; the bars 30$^a$ and 31$^a$, and also the bars 30$^b$ and 31$^b$ being connected centrally by the pivots 32 and 32'. The bars 30 and 31 which are mounted on the pivot 21 preferably have the end portions thereof which are mounted on said pivot enlarged and connected by links 34' and 35', and links 34 and 35, to the rack bars 24 and 24'; the links 34 and 35 being arranged side by side and having opposite ends connected to the rack bar 24' and the bar 30, and the links 34' and 35' being arranged side by side and having opposite ends connected to the rack bar 24 and the bar 31, see Fig. 8, in such manner that when the signal arm 26 is in the full expanded condition the links 34 and 35 and the links 34' and 35' are disposed substantially at right angles to each other as seen in Fig. 5. Conductors 28' passing through guides 29' on the signal arm 26 and frame 12 are connected to the electric lamp 28 and to a suitable source, not shown, of electric current supply. In mesh with the rack bars 24 and 24' is a pinion 36 which when rotated in one direction moves the rack bars 24 and 24' in opposite directions to each other and causes the links 34 and 35 and the links 34' and 35' to expand the signal arm 26 to display the visual signals 27 and 28; when the pinion 36 is rotated in the other direction it moves the rack bars 24 and 24' back to their former position and causes the links 34 and 35 and the links 34' and 35' to contract the signal arm 26.

Any suitable operating mechanism may be connected to the pinion 36 to operate the signal apparatus; that shown consisting of the shaft 37 which passes through the cover plate 17 and has one end thereof secured to the pinion 36 and has on its other end the crank disk 38 which is provided with a wrist-pin 39 on which is pivotally mounted the arm 40 to which is connected one end of a coil spring 41 which has its other end connected to the cover plate 17 of the frame 12. Between guides 42 on the cover plate 17 is arranged a slide 43 which contacts with one end of a bar 44 which is adapted to fit in notches 45 at the opposite sides of the slide 43 and has its other end portion pivotally mounted on the wrist-pin 39. The slide 43 preferably has its side portions 46 extending through the guides 42. Retracting springs 47 are connected to the side portions 46 and to the cover plate 17 of the frame 12, and a wire or cord 48 is attached to the side portions 46 and passes through guides 49 to the steering post 50. A handle or knob 51 at the end of the wire or cord 48 expedites pulling the latter to operate the slide 43. By referring to Figs. 9, 10, and 11, it will be understood that when the cord 48 is pulled the slide 43 is moved against the tension of the springs 47 and moves the bar 44 so that the latter rotates the crank disk 38 and arm 40 to the position shown in Fig. 10 and tensions the spring 41. When the cord 48 is released the springs 47 act to return the slide 43 to its normal position and the spring 41 acts to move the crank disk 38 to the position shown in Fig. 11 and causes the end portion of the bar 44 to move against the stop or post 52 so that the bar 44 is swung to the opposite side of the slide 43. The rotation of the crank disk 38 as just described results in rotation of the pinion 36 and movement of the rack bars 24 and 24' to cause the links 34 and 35 and links 34' and 35' to expand the lazy tongs and place the signal arm 36 in the operative condition. If now the cord 48 is again pulled and released it will be seen that the crank disk 38 is rotated in a reverse direction, the bar 44 is moved against the post 53 and swung to the other side of the slide 43, and the pinion 36 moves the rack bars 24 and 24' to cause the links 34 and 35 and links 34' and 35' to contract the lazy tongs and place the signal arm 26 in inoperative condition. The signal apparatus can be placed on either or both sides of the auto vehicle 15', and if desired it can be used as a side light by mounting a shield or panel 54 in front of the signal apparatus; said shield or panel 54 extending substantially at right angles to the auto vehicle 15' and having an opening 55 directly in front of the electric lamp 28.

The construction which has been particularly illustrated and described admits of changes and modifications—wherefore the right is reserved to all such changes and modifications as do not depart from the spirit and scope of the invention which is defined in the appended claims.

I claim:

1. The combination of a frame, a pivot thereon, rack bars slidably mounted on the frame, a lazy tongs arm mounted on said pivot and carrying a signal, operative connections between the lazy tongs and the rack bars, a pinion in mesh with said rack bars, a shaft connected to the pinion, a crank disk secured to said shaft and provided with a wrist-pin, a slide mounted on said frame, a retracting spring connected to said slide and to said frame, an arm pivotally mounted on the wrist-pin, a tension spring connected to said arm and to said frame, a bar having one end portion thereof pivotally mounted on said wrist-pin and having its other end normally in contact with said slide, means for operating the slide, and posts arranged adjacent to said crank disk substantially as and for the purpose set forth.

2. The combination of a frame, a signal arm mounted thereon, a slide, a retracting spring connected to the slide and to the frame, a crank disk having a wrist-pin thereon, means operatively connecting the signal arm to the crank disk, an arm pivotally mounted on the wrist-pin, a tension spring connected to said arm and to said frame, a bar having one end portion thereof pivotally mounted on said wrist-pin and having its other end normally in contact with said slide, means for operating the slide, and posts arranged adjacent to said crank disk substantially as and for the purpose set forth.

In testimony whereof, I have signed my name to this specification at Los Angeles, county of Los Angeles, State of California, this 12th day of February A. D. 1916.

TORAKI KITAOKA.